(12) United States Patent
Blackwell et al.

(10) Patent No.: US 10,132,140 B2
(45) Date of Patent: Nov. 20, 2018

(54) DRILLING FLUID DISPOSAL INJECTION SYSTEM AND METHOD

(71) Applicant: Milestone Environmental Services, LLC., Houston, TX (US)

(72) Inventors: Mark Blackwell, Houston, TX (US); Steve Bills, Houston, TX (US); Jason Larchar, Spring, TX (US)

(73) Assignee: MILESTONE ENVIRONMENTAL SERVICES, LLC., Houston, TX (US)

( * ) Notice: Subject to any disclaimer, the term of this patent is extended or adjusted under 35 U.S.C. 154(b) by 0 days.

(21) Appl. No.: 15/596,580

(22) Filed: May 16, 2017

(65) Prior Publication Data

US 2017/0335660 A1    Nov. 23, 2017

Related U.S. Application Data

(60) Provisional application No. 62/337,523, filed on May 17, 2016.

(51) Int. Cl.
| | | |
|---|---|---|
| *E21B 41/00* | (2006.01) | |
| *E21B 21/06* | (2006.01) | |
| *B01D 21/28* | (2006.01) | |
| *C09K 8/03* | (2006.01) | |

(52) U.S. Cl.
CPC ........ *E21B 41/0057* (2013.01); *B01D 21/283* (2013.01); *E21B 21/062* (2013.01); *E21B 21/066* (2013.01); *E21B 21/068* (2013.01); *C09K 8/03* (2013.01)

(58) Field of Classification Search
CPC .. E21B 21/066; E21B 41/0057; E21B 21/065; E21B 21/062
See application file for complete search history.

(56) References Cited

U.S. PATENT DOCUMENTS

| | | | | |
|---|---|---|---|---|
| 5,589,603 A | * | 12/1996 | Alexander | .............. B09B 1/008 |
| | | | | 166/305.1 |
| 6,640,912 B2 | * | 11/2003 | Reddoch | ............... E21B 21/066 |
| | | | | 166/275 |
| 2014/0371113 A1 | * | 12/2014 | Fout | ...................... E21B 21/066 |
| | | | | 507/117 |

* cited by examiner

*Primary Examiner* — Catherine Loikith

(74) *Attorney, Agent, or Firm* — MH2 Technology Law Group LLP

(57) ABSTRACT

A method for injecting a portion of a drilling fluid waste into a well includes separating solids from the drilling fluid waste to produce a filtered drilling fluid waste. A cross-sectional dimension of at least a portion of the solids is reduced. The filtered drilling fluid waste is combined with the at least a portion of the solids that were reduced in dimension to produce a slurry. A property of the slurry is measured. The property is adjusted in response to measuring the property. The slurry is injected into the well.

20 Claims, 3 Drawing Sheets

DRILLING FLUID DISPOSAL INJECTION SYSTEM AND METHOD

CROSS-REFERENCE TO RELATED APPLICATIONS

This application claims priority to a provisional patent application having application No. 62/337,523, filed on May 17, 2016, the entirety of which is incorporated herein by reference.

BACKGROUND

When drilling a wellbore in a subterranean formation, a fluid is pumped down into the wellbore to cool the drill bit and to circulate cuttings from the subterranean formation back to the surface. This fluid with cuttings is referred to as a drilling fluid waste. The drilling fluid waste may present additional environmental liabilities and be expensive to dispose of at the surface. As a result, it may be desirable to dispose of the drilling fluid waste by pumping the drilling fluid waste back into the subterranean formation. However, particles in the drilling fluid waste may fall out of the drilling fluid waste if the density and/or viscosity of the drilling fluid waste is not within a predetermined range.

SUMMARY

A method for injecting a portion of a drilling fluid waste into a well is disclosed. The method includes separating solids from the drilling fluid waste to produce a filtered drilling fluid waste. A cross-sectional dimension of at least a portion of the solids is reduced. The filtered drilling fluid waste is combined with the at least a portion of the solids that were reduced in dimension to produce a slurry. A property of the slurry is measured. The property is adjusted in response to measuring the property. The slurry is injected into the well.

A system for injecting a portion of a drilling fluid waste into a well is also disclosed. The system includes a shaker configured to separate solids from the drilling fluid waste to produce a filtered drilling fluid waste. The system also includes a particle size reducer in fluid communication with the shaker and configured to reduce a cross-sectional dimension of at least a portion of the solids. The system also includes a tank in fluid communication with the shaker and the particle size reducer. The tank is configured to mix the filtered drilling fluid waste from the shaker with the solids from the particle size reducer to produce a slurry. The system also includes a first sensor configured to measure a property of the slurry. The system also includes a first valve in fluid communication with the tank and configured to be actuated to adjust the property in response to measuring the property.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
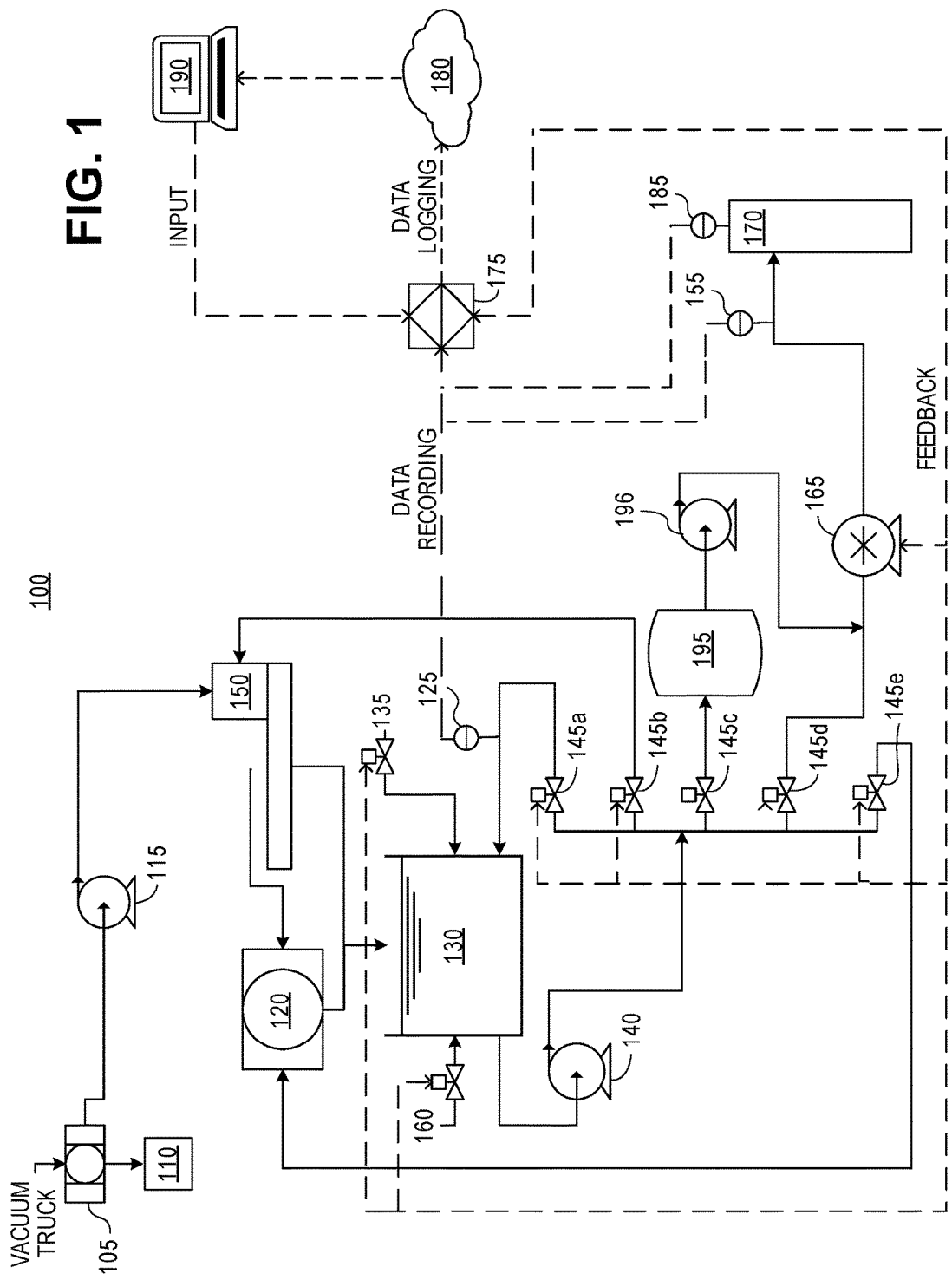
FIG. 1 illustrates a schematic view of a fluid disposal injection system, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. The embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Finally, unless otherwise provided herein, "or" statements are intended to be non-exclusive; for example, the statement "A or B" should be considered to mean "A, B, or both A and B."

Embodiments of the present disclosure may provide a system and method for injecting a portion of a drilling fluid waste back into a subterranean formation. The method includes separating larger particles from the drilling fluid waste, reducing a size of the larger particles after separation, re-combining the reduced-in-size particles with the remainder of the drilling fluid waste to produce a slurry, and injecting the slurry into a disposal well (also called an injection well) 170. The properties of the slurry may be measured, and additives may be added to the slurry in response to the measurements.

FIG. 1 illustrates a schematic view of a fluid disposal injection system 100, according to an embodiment. The system 100 may be used to produce a slurry from drilling fluids and other additives to ensure efficient waste disposal. The system 100 may include a strainer 105 that receives drilling fluid waste from a wellbore, e.g., the strainer 105 may receive the drilling fluid waste from a vacuum truck, or may be part of a vacuum truck. The strainer 105 may be configured to filter/separate a first set of solids (e.g., stones, nuts, bolts, rags, gloves, etc.) from the drilling fluid waste that may be harmful to the processing equipment. In one embodiment, the strainer 105 may separate solids from the drilling fluid waste that have a maximum cross-sectional dimension that is greater than or equal to about 0.25 inches or about 0.375 inches. This may produce (1) a removed first set of solids and (2) a first filtered drilling fluid waste. The removed first set of solids output from the strainer 105 may be transferred into a debris disposal unit 110. The debris disposal unit 110 may include bins or other waste collection receptacles that accumulate debris from the strainer 105. The first filtered drilling fluid waste output from the strainer 105 may be pumped to a shaker 150 via a pump 115.

The shaker 150 may be or include a shale shaker, a centrifuge, a filter, a strainer basket, a sieve, or the like. The shaker 150 may filter/separate a second set of solids (e.g., particles) from the first filtered drilling fluid waste that have a maximum cross-sectional dimension that is greater than about 100 microns, greater than about 200 microns, greater than about 300 microns, greater than about 400 microns, greater than about 500 microns, or larger. This may produce (1) a removed second set of solids (e.g., particles) and (2) a second filtered drilling fluid waste. The size of the particles to be removed may be determined by formation properties, anticipated pumping schedules, and/or injection modeling software. For example, formations of higher porosity (e.g., >20%) can tolerate solids particles upwards of 1,000 microns, while formations of lower porosity (e.g., <10%) can tolerate fine particles less than 100 microns. In one example, the size of the second set of solids may be determined by analyzing the formation porosity from gamma-ray emitting tools from open-hole logs and coordinating the porosity of the disposal well 170 with an appropriate classification size. The removed particles output from the shaker 150 may be transferred to a particle size reducer 120. The second filtered drilling fluid waste from the shaker 150 may be transferred to a mixing tank 130.

The particle size reducer 120 may be or include a grinder or ball mill which may cleave, disaggregate, crush, or separate the removed (e.g., oversized) particles into particles of a predetermined (e.g., smaller) size. For example, the particles may be reduced to a size that allows the particles to pass through a filter in the shaker 150 and be sent to the mixing tank 130. Once the particles have been reduced in size, they may be transferred into the mixing tank 130.

The mixing tank 130 may collect, mix, and agitate the second filtered drilling fluid waste from the shaker 150 and/or the reduced-in-size particles from the particle size reducer 120 to produce a substantially homogeneous slurry. In at least one embodiment, other additives may be added to the slurry in the mixing tank 130.

A portion of the slurry from the mixing tank 130 may be transferred to one or more valves (five are shown: 145A-145E) via a pump 140. In addition to causing the slurry to flow to the valves 145A-145E, the pump 140 may also perform a secondary grinding of the particles in the slurry (e.g., to reduce the size of the particles). The valve 145A may transfer a portion of the slurry back to the mixing tank 130 for agitation purposes, as determined by a programmable logic controller or "PLC" 175 (described below). This portion of the slurry may re-enter the mixing tank 130 through a series of mud guns located at the bottom of the mixing tank 130. In one embodiment, the recirculation line is approximately a constant 20-30% of total volumetric output from the pump 140.

The valve 145B may transfer a portion of the slurry back to the shaker 150 to re-filter the material to ensure proper particle sizes, as determined by the PLC 175. The valve 145C may transfer a portion of the slurry to a storage vessel 195 for temporary storage and subsequent injection into the disposal well 170, as determined by the PLC 175. The valve 145D may transfer a portion of the slurry to an injection pump 165 (described below), which injects the slurry down into the disposal well 170, as determined by the PLC 175. The valve 145E may transfer a portion of the slurry back to the particle size reducer 120 to assist in material flux through the particle size reducer 120, as determined by the PLC 175. This may prevent solids from packing off, bridging, or plugging the particle size reducer 120.

The PLC 175 may use inputs, data records, and a feedback loop to adjust the system 100. As shown, the PLC 175 may be connected to one or more sensors 125, 155, 185, one or more valves 135, 145A-145E, 160, one or more pumps 165, a data storage 180, and a computing system 190.

The sensor 125 may be configured to measure one or more properties of the slurry that is being re-introduced back into the mixing tank 130 (e.g., the slurry flowing between the valve 145A and the mixing tank 130). The sensor 155 may be configured to measure one or more properties of the slurry that is being injected into the disposal well 170 (e.g., between the injection pump 165 and the disposal well 170). The properties measured by the sensor 125 and/or the sensor 155 may be or include the flowrate, the viscosity, and the density, the pressure, and/or the temperature of the slurry. For example, one or more of the sensors 125, 155 may be or include a densitometer or a viscometer. The sensor 185 may measure a pressure of the slurry or other fluids in the disposal well 170. The measurements from the sensors 125, 155, 185 may be transmitted to the PLC 175.

The valve 135 may be configured to prefill and/or regulate the volume of other fluids (e.g., drilling mud, produced water, brackish water) that is introduced into the mixing tank 130, depending on the properties of the slurry in the mix tank 130. The valve 160 may regulate the volume of additives (e.g., viscosifiers, barite, polymer, water) to the slurry to control the rheological properties. For example, the additives may be added to the slurry in response to the properties measured by the sensor 125. The valves 135, 160 may be controlled by the PLC 175.

The properties of the slurry may depend at least partially on the subterranean formation and economic constraints. For example, to carry particles deep within the disposal formation, the viscosity may be sufficient to prevent premature settling. In the system 100, the viscosity may be increased with barite or polymer additives using a series of viscometers, one or more polymer feed pumps with variable frequency drives, and the PLC 175. In another embodiment, the viscosity may be measured, and the polymer additives may be introduced manually in response to the measurements.

To assist in achieving proper bottom-hole pressure (i.e., the primary force that induces flowrate through, and fracturing of, the formation), the density of the slurry may be maintained or modified to be sufficient to increase the hydrostatic pressure inside of the fluid column of the disposal well 170. In the system 100, the density may be controlled by adding barite automatically with a barite feed auger in response to transmitting measurements from one or more densitometers to the PLC 175. In another embodiment, the slurry may be manually weighed, and sacks of barite may be introduced in response to the weight.

The injection rate may be sufficient to provide a predetermined surface pressure and may, or may not, propagate fracture growth in the subterranean formation of the disposal well 170. The injection rate may be controlled with the injection pump 165 automatically through a series of pressure sensors, flow meters, densitometers, and the PLC 175. In another embodiment, the injection rate may be controlled manually by adjusting a variable frequency drive of the injection pump 165.

The fluid properties of the injected slurry may vary depending upon the operational schedule of the pump 140, 196, and/or 165 or how the formation of the disposal well 170 is responding to the injection event. For example, if a gradual increase in the measured surface pressure occurs with no change in the injection rate, this may indicate filter cake build-up at the perforations in the subterranean formation of the disposal well 170. In response to this, the user may deviate from the initial injection slurry by decreasing the density and/or viscosity of the slurry and increasing the injection rate to shear the solids build-up.

The PLC 175 may be configured to store the measurements from the sensors 125, 155, 185 in the data storage 180. In one specific embodiment, the data storage 180 may be a cloud-based server. The computing system 190 and/or the PLC 175 may be used to retrieve the measured properties from the data storage 180 and/or monitor the measured properties. In response to the measured properties, the computing system 190 and/or the PLC 175 may then actuate one or more of the valves 135, 145A-145E, 160.

Figure 2:
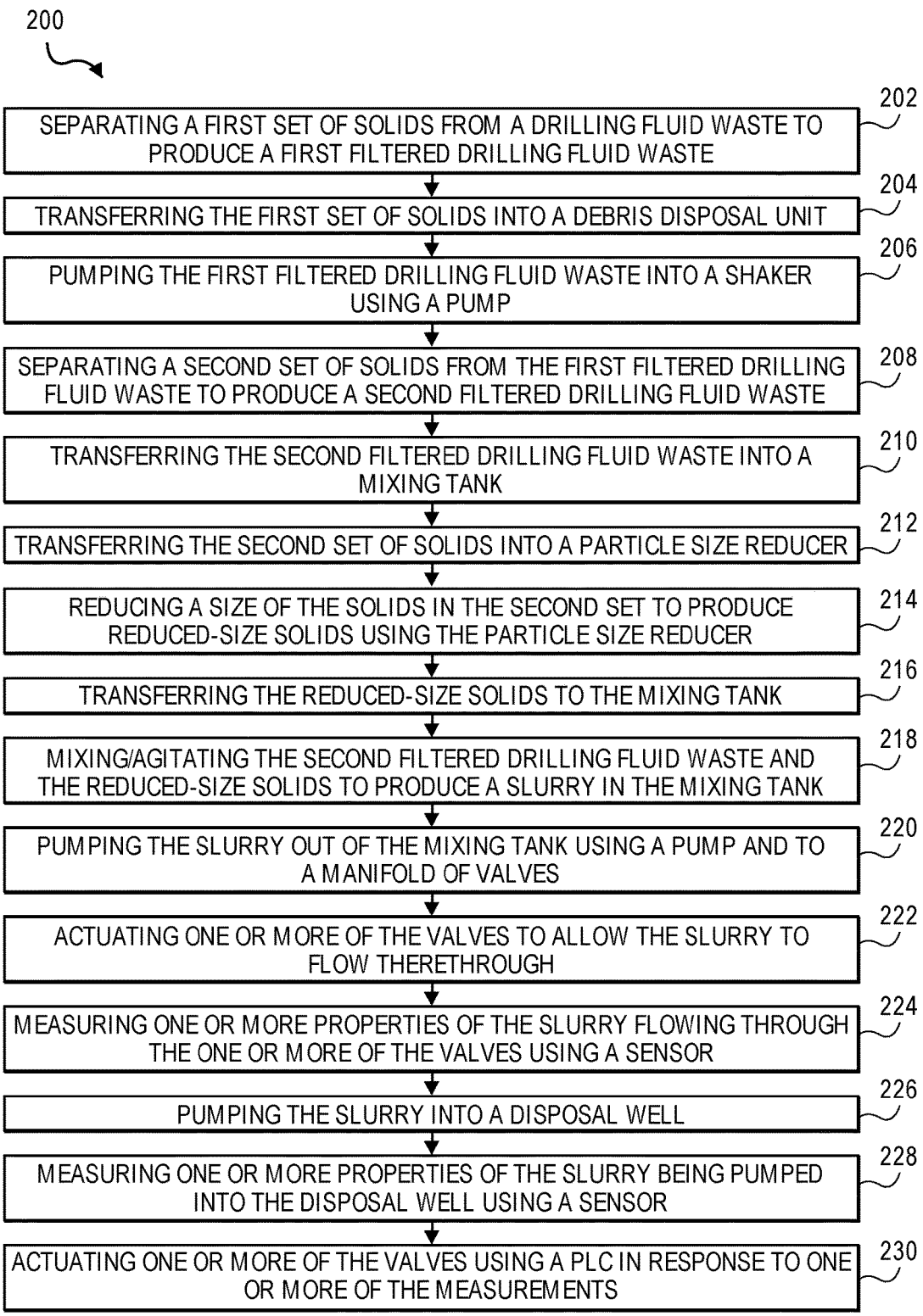
FIG. 2 illustrates a flowchart of a method for injecting a portion of a drilling fluid waste into a well, according to an embodiment.

FIG. 2 illustrates a flowchart of a method 200 for injecting a portion of a drilling fluid waste into the disposal well 170, according to an embodiment. The method 200 may include separating a first set of solids from the drilling fluid waste to produce a first filtered drilling fluid waste, as at 202. The separation at 202 may take place using the strainer 105. The method 200 may also include transferring the first set of solids into the debris disposal unit 110, as at 204. The method 200 may also include pumping the first filtered drilling fluid waste into the shaker 150 using the pump 115, as at 206. The method 200 may also include separating a second set of solids from the first filtered drilling fluid waste to produce a second filtered drilling fluid waste, as at 208. The separation at 208 may take place using the shaker 150. The method 200 may also include transferring the second filtered drilling fluid waste into the mixing tank 130, as at 210. The method 200 may also include transferring the second set of solids into the particle size reducer 120, as at 212.

The method 200 may also include reducing a size of the solids in the second set to produce reduced-size solids using the particle size reducer (e.g., grinder) 120, as at 214. The method 200 may also include transferring the reduced-size solids to the mixing tank 130, as at 216. The method 200 may also include mixing/agitating the second filtered drilling fluid waste and the reduced-size solids to produce a slurry in the mixing tank 130, as at 218.

The method 200 may also include pumping the slurry out of the mixing tank 130 using the pump 140 and to a manifold of valves 145A-145E, as at 220. The method 200 may also include actuating one or more of the valves 145A-145E to allow the slurry to flow therethrough, using the PLC 175 and/or the computing system 190, as at 222. For example, the slurry may flow through the valve 145A and back to the mixing tank 130, through the valve 145B and back into the shaker 150, through the valve 145C and into the storage vessel 195, through the valve 145D and to the injection pump 165, and/or through the valve 145E and to the particle size reducer (e.g., grinder) 120.

The method 200 may also include measuring one or more properties of the slurry flowing through the one or more of the valves (e.g., valve 145A) using the sensor 125 (and transmitting the measurement to the PLC 175, the data storage 180, and/or the computing system 190), as at 224. The method 200 may also include pumping the slurry into the disposal well 170, as at 226. For example, the slurry may be temporarily stored in the storage vessel 195 and then pumped into the disposal well 170 using a transfer pump 196 and/or the injection pump 165. In another example, the slurry may bypass the storage vessel 195 and the transfer pump 196 and be pumped directly into the disposal well 170 using the injection pump 165.

The method 200 may also include measuring one or more properties of the slurry being pumped into the disposal well 170 using the sensor 155 and/or one or more properties of other fluids in the disposal well 170 using the sensor 185 (and transmitting the measurement to the PLC 175, the data storage 180, and/or the computing system 190), as at 228. The method 200 may also include actuating (e.g., partially opening, fully opening, or closing) one or more of the valves 135, 145A-145E, 160 using the PLC 175 in response to one or more of the measurements, as at 230.

Figure 3:
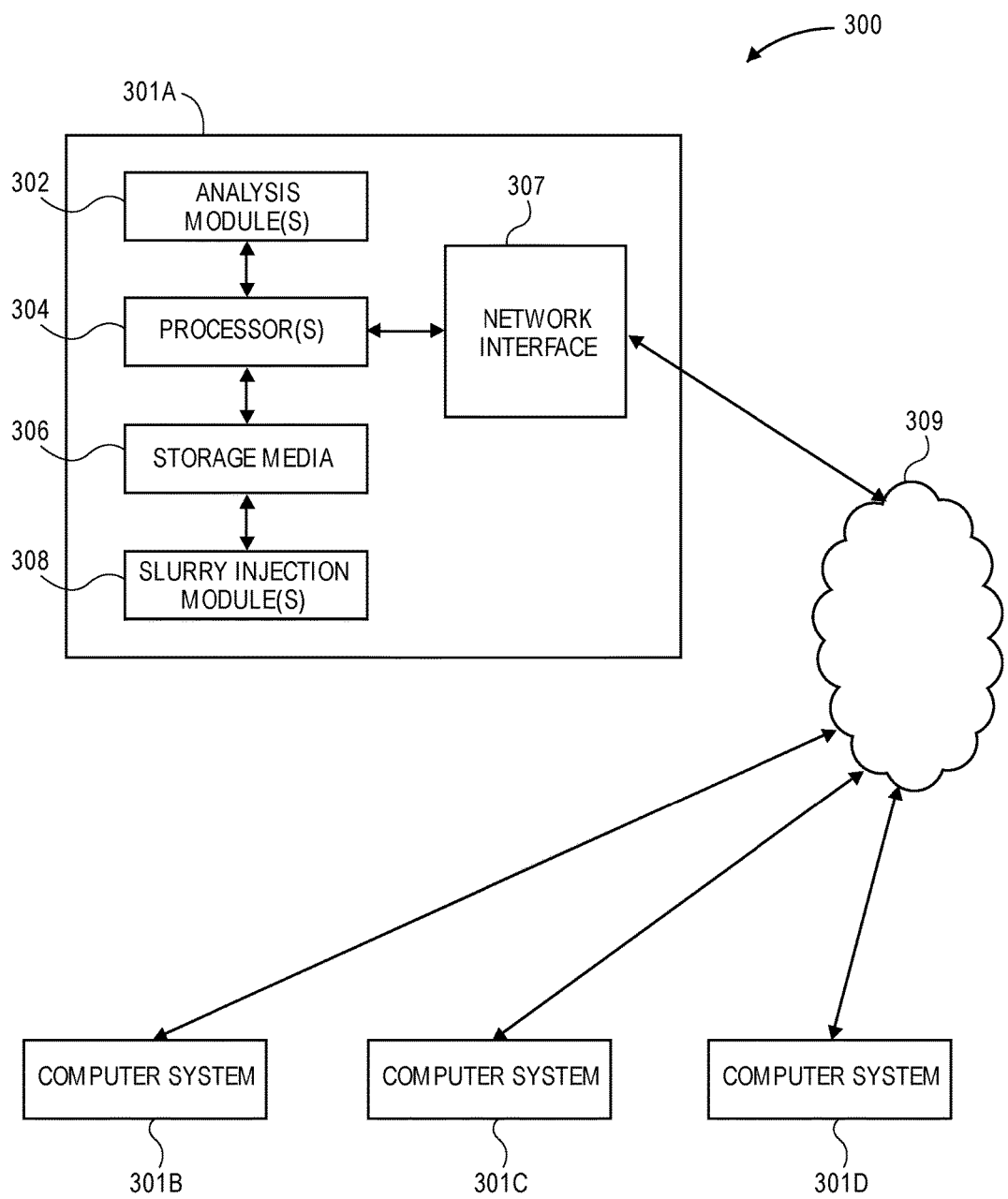
FIG. 3 illustrates an example of a computing system for performing at least a portion of the method, according to an embodiment.

FIG. 3 illustrates a schematic view of a computing system 300, which may provide the computing system 190 of FIG. 1, according to an embodiment. The computing system 300 may include a computer or computer system 301A, which may be an individual computer system 301A or an arrangement of distributed computer systems. The computer system 301A includes one or more analysis module(s) 302 configured to perform various tasks according to some embodiments, such as one or more methods disclosed herein. To perform these various tasks, the analysis module 302 executes independently, or in coordination with, one or more processors 304, which is (or are) connected to one or more storage media 306. The processor(s) 304 is (or are) also connected to a network interface 307 to allow the computer system 301A to communicate over a data network 309 with one or more additional computer systems and/or computing systems, such as 301B, 301C, and/or 301D (note that computer systems 301B, 301C and/or 301D may or may not share the same architecture as computer system 301A, and may be located in different physical locations, e.g., computer systems 301A and 301B may be located in a processing facility, while in communication with one or more computer systems such as 301C and/or 301D that are located in one or more data centers, and/or located in varying countries on different continents).

A processor can include a microprocessor, microcontroller, processor module or subsystem, programmable integrated circuit, programmable gate array, or another control or computing device.

The storage media 306 can be implemented as one or more computer-readable or machine-readable storage media. Note that while in the example embodiment of FIG. 3 storage media 306 is depicted as within computer system 301A, in some embodiments, storage media 306 may be distributed within and/or across multiple internal and/or external enclosures of computing system 301A and/or additional computing systems. Storage media 306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 300 contains one or more slurry injection module(s) 308. In the example of computing system 300, computer system 301A includes the slurry injection module 308. In some embodiments, a single slurry injection module may be used to perform at least some aspects of one or more embodiments of the methods. In other embodiments, a plurality of slurry injection modules may be used to perform at least some aspects of the methods.

It should be appreciated that computing system 300 is one example of a computing system, and that computing system 300 may have more or fewer components than shown, may combine additional components not depicted in the example embodiment of FIG. 3, and/or computing system 300 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for injecting a portion of a drilling fluid waste into a well, comprising:
   separating solids from the drilling fluid waste to produce a filtered drilling fluid waste;
   reducing a cross-sectional dimension of at least a portion of the solids;
   combining, in a tank, the filtered drilling fluid waste with the at least a portion of the solids that were reduced in dimension to produce a slurry;
   actuating a first valve, wherein, in response to actuating the first valve, the slurry flows out of the tank, through the first valve, and back into the tank prior to being injected into the well;
   measuring a property of the slurry;
   causing the property to be adjusted in response to measuring the property; and
   injecting the slurry into the well.

2. The method of claim 1, further comprising measuring the property after the slurry flows through the first valve and before the slurry flows back into the tank.

3. The method of claim 1, further comprising actuating a second valve in response to measuring the property, wherein, in response to actuating the second valve, the slurry flows out of the tank, through the second valve, and into a shaker that separates the solids from the drilling fluid waste.

4. The method of claim 1, further comprising actuating a second valve in response to measuring the property, wherein, in response to actuating the second valve, the slurry flows out of the tank, through the valve, and into a storage vessel.

5. The method of claim 1, further comprising actuating a second valve in response to measuring the property, wherein, in response to actuating the second valve, the slurry flows out of the tank, through the valve, and into the well.

6. The method of claim 5, wherein the property is measured after the slurry flows through the second valve and before the slurry flows into the well.

7. The method of claim 1, further comprising actuating a second valve in response to measuring the property, wherein, in response to actuating the second valve, the slurry flows out of the tank, through the valve, and into a grinder that reduces the cross-sectional dimension of at least a portion of the solids.

8. The method of claim 1, wherein the property comprises a viscosity of the slurry, and further comprising adjusting the property by actuating the first valve or a second valve, which causes barite or a polymer to be added into the slurry to adjust the viscosity of the slurry.

9. The method of claim 1, wherein the property comprises a density of the slurry, and further comprising adjusting the property by actuating the first valve or a second valve, which causes barite to be added into the slurry to increase the density of the slurry.

10. A system for injecting a portion of a drilling fluid waste into a well, comprising:
   a shaker configured to separate solids from the drilling fluid waste to produce a filtered drilling fluid waste;
   a particle size reducer in fluid communication with the shaker and configured to reduce a cross-sectional dimension of at least a portion of the solids;
   a tank in fluid communication with the shaker and the particle size reducer, wherein the tank is configured to mix the filtered drilling fluid waste from the shaker with the solids from the particle size reducer to produce a slurry;

a first sensor configured to measure a property of the slurry; and a first valve in fluid communication with the tank, wherein, in response to actuating the first valve, the slurry flows out of the tank, through the first valve, and back into the tank prior to being injected into the well.

11. The system of claim 10, further comprising a first pump in fluid communication with the tank and configured to cause the slurry to flow out of the tank, wherein the first pump also reduces the cross-sectional dimension of at least a portion of the solids in the slurry.

12. The system of claim 11, further comprising:

a second valve in fluid communication with the first pump, wherein, in response to actuating the second valve, the first pump causes the slurry to flow out of the tank, through the first pump and the second valve, and back into the tank;

a third valve in fluid communication with the first pump, wherein, in response to actuating the third valve, the first pump causes the slurry to flow out of the tank, through the first pump and the third valve, and into the shaker;

a fourth valve in fluid communication with the first pump, wherein, in response to actuating the fourth valve, the first pump causes the slurry to flow out of the tank, through the first pump and the fourth valve, and into a storage vessel;

a fifth valve in fluid communication with the first pump, wherein, in response to actuating the fifth valve, the first pump causes the slurry to flow out of the tank, through the first pump and the fifth valve, and into the well; and a sixth valve in fluid communication with the first pump, wherein, in response to actuating the sixth valve, the first pump causes the slurry to flow out of the tank, through the first pump and the sixth valve, and into the particle size reducer.

13. The system of claim 12, wherein the first sensor measures the property after the slurry flows through the second valve and before the slurry flows back into the tank.

14. The system of claim 12, further comprising a second pump in fluid communication with, and downstream from, the storage vessel, and wherein the second pump causes the slurry to flow out of the storage vessel.

15. The system of claim 14, further comprising a third pump in fluid communication with the fifth valve, wherein the third pump causes the slurry to flow into the well.

16. The system of claim 15, wherein the third pump is also in fluid communication with, and downstream from, the second pump.

17. The system of claim 16, further comprising a second sensor in fluid communication with, and downstream from, the third pump, wherein the second sensor is also configured to measure the property of the slurry, and wherein the first valve is configured to be actuated to adjust the property in response to the first and second valves measuring the property.

18. The system of claim 10, wherein the first valve comprises a first portion and a second portion, the first portion for introducing drilling mud, produced water, brackish water, or a combination thereof, and the second portion for introducing viscosifiers, barite, polymers, or a combination thereof.

19. The system of claim 10, wherein the property comprises a viscosity of the slurry, and wherein the property is adjusted by actuating a valve, which adds barite or a polymer into the slurry to adjust the viscosity of the slurry.

20. A system for injecting a portion of a drilling fluid waste into a well, comprising:

a shaker configured to separate solids from the drilling fluid waste to produce a filtered drilling fluid waste;

a particle size reducer in fluid communication with the shaker and configured to reduce a cross-sectional dimension of at least a portion of the solids;

a tank in fluid communication with the shaker and the particle size reducer, wherein the tank is configured to mix the filtered drilling fluid waste from the shaker with the solids from the particle size reducer to produce a slurry;

a first pump in fluid communication with the tank and configured to cause the slurry to flow out of the tank, wherein the first pump also reduces the cross-sectional dimension of at least a portion of the solids in the slurry;

a first sensor configured to measure a property of the slurry;

a first valve in fluid communication with the tank and configured to be actuated to adjust the property in response to measuring the property;

a second valve in fluid communication with the first pump, wherein, in response to actuating the second valve, the first pump causes the slurry to flow out of the tank, through the first pump and the second valve, and back into the tank;

a third valve in fluid communication with the first pump, wherein, in response to actuating the third valve, the first pump causes the slurry to flow out of the tank, through the first pump and the third valve, and into the shaker;

a fourth valve in fluid communication with the first pump, wherein, in response to actuating the fourth valve, the first pump causes the slurry to flow out of the tank, through the first pump and the fourth valve, and into a storage vessel;

a fifth valve in fluid communication with the first pump, wherein, in response to actuating the fifth valve, the first pump causes the slurry to flow out of the tank, through the first pump and the fifth valve, and into the well; and a sixth valve in fluid communication with the first pump, wherein, in response to actuating the sixth valve, the first pump causes the slurry to flow out of the tank, through the first pump and the sixth valve, and into the particle size reducer.

* * * * *

EX PARTE REEXAMINATION CERTIFICATE (11712th)

United States Patent
Blackwell et al.

(12) EX PARTE REEXAMINATION CERTIFICATE (11712th)

(10) Number: US 10,132,140 C1
(45) Certificate Issued: Aug. 17, 2020

(54) DRILLING FLUID DISPOSAL INJECTION SYSTEM AND METHOD

(71) Applicant: Milestone Environmental Services, LLC., Houston, TX (US)

(72) Inventors: Mark Blackwell, Houston, TX (US); Steve Bills, Houston, TX (US); Jason Larchar, Spring, TX (US)

(73) Assignee: MILESTONE ENVIRONMENTAL SERVICES, LLC., Houston, TX (US)

Reexamination Request:
No. 90/014,325, Jun. 26, 2019

Reexamination Certificate for:
Patent No.: 10,132,140
Issued: Nov. 20, 2018
Appl. No.: 15/596,580
Filed: May 16, 2017

Related U.S. Application Data

(60) Provisional application No. 62/337,523, filed on May 17, 2016.

(51) Int. Cl.
*E21B 41/00* (2006.01)
*E21B 21/06* (2006.01)
*B01D 21/28* (2006.01)
*C09K 8/03* (2006.01)

(52) U.S. Cl.
CPC ........ *E21B 41/0057* (2013.01); *E21B 21/062* (2013.01); *E21B 21/066* (2013.01); *E21B 21/068* (2013.01); *C09K 8/03* (2013.01)

(58) Field of Classification Search
None
See application file for complete search history.

(56) References Cited

To view the complete listing of prior art documents cited during the proceeding for Reexamination Control Number 90/014,325, please refer to the USPTO's public Patent Application Information Retrieval (PAIR) system under the Display References tab.

*Primary Examiner* — Catherine S Williams

(57) ABSTRACT

A method for injecting a portion of a drilling fluid waste into a well includes separating solids from the drilling fluid waste to produce a filtered drilling fluid waste. A cross-sectional dimension of at least a portion of the solids is reduced. The filtered drilling fluid waste is combined with the at least a portion of the solids that were reduced in dimension to produce a slurry. A property of the slurry is measured. The property is adjusted in response to measuring the property. The slurry is injected into the well.

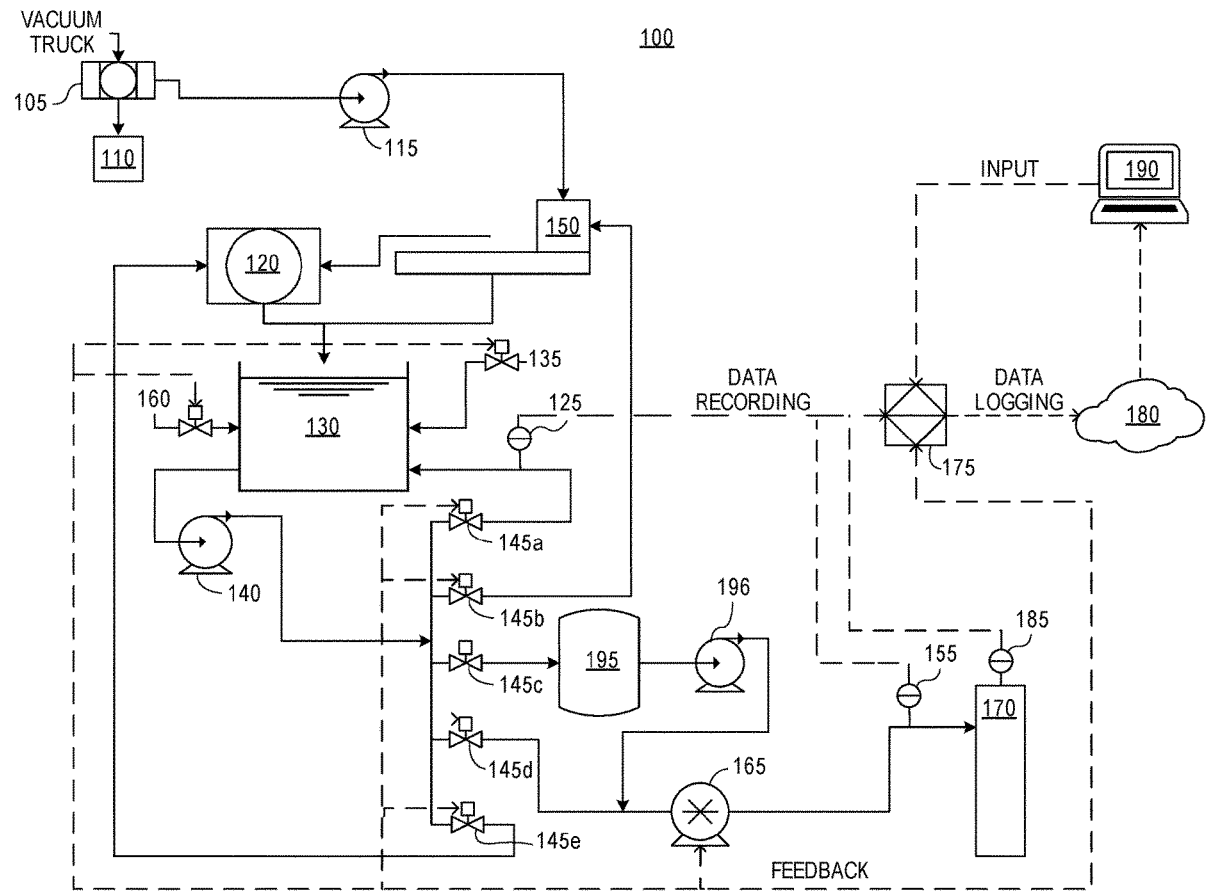

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3-5, 7 and 12 are cancelled.

Claims 1, 6, 10, 13-14 and 20 are determined to be patentable as amended.

Claims 2, 8-9, 11 and 15-19, dependent on an amended claim, are determined to be patentable.

New claims 21-24 are added and determined to be patentable.

1. A method for injecting a portion of a drilling fluid waste into a well, comprising:
   separating solids from the drilling fluid waste to produce a filtered drilling fluid waste;
   reducing a cross-sectional dimension of at least a portion of the solids, *using a shaker and a grinder*;
   combining, in a tank, the filtered drilling fluid waste with the at least a portion of the solids that were reduced in dimension to produce a slurry;
   [actuating a first valve, wherein, in response to actuating the first valve, the slurry flows out of the tank, through the first valve, and back into the tank prior to being injected into the well;]
   measuring a property of the slurry;
   causing the property to be adjusted in response to measuring the property, *wherein causing the property to be adjusted comprises controlling a manifold of valves to selectively flow the slurry from the pump to the shaker, the grinder, the tank, a storage vessel, and the well so as to adjust the property, wherein controlling the manifold of valves comprises:*
      *actuating a first valve of the manifold to adjust the property, wherein, in response to actuating the first valve, the slurry flows out of the tank, through the first valve, and back into the tank prior to being injected into the well;*
      *actuating a second valve of the manifold to adjust the property, wherein, in response to actuating the second valve, the slurry flows out of the tank, through the second valve, and into the shaker;*
      *actuating a third valve of the manifold to adjust the property, wherein, in response to actuating the third valve, the slurry flows out of the tank, through the valve, and into the storage vessel;*
      *actuating a fourth valve of the manifold to adjust the property, wherein, in response to actuating the fourth valve, the slurry flows out of the tank, through the fourth valve, and into the grinder;*
      *actuating a fifth valve of the manifold to adjust the property, wherein, in response to actuating the fifth valve, the slurry flows out of the tank, through the fifth valve, and to an injection pump;* and
   injecting the slurry into the well *using the injection pump*.

6. The method of claim [5] *1*, wherein the property is measured after the slurry flows through the [second] *fifth* valve and before the slurry flows into the well.

10. A system for injecting a portion of a drilling fluid waste into a well, comprising:
   a shaker configured to separate solids from the drilling fluid waste to produce a filtered drilling fluid waste;
   a particle size reducer in fluid communication with the shaker and configured to reduce a cross-sectional dimension of at least a portion of the solids;
   a tank in fluid communication with the shaker and the particle size reducer, wherein the tank is configured to mix the filtered drilling fluid waste from the shaker with the solids from the particle size reducer to produce a slurry;
   a first sensor configured to measure a property of the slurry; and
   *a manifold of valves operable to adjust the property, the manifold of valves comprising:*
      a first valve in fluid communication with the tank, wherein, in response to actuating the first valve, the slurry flows out of the tank, through the first valve, and back into the tank prior to being injected into the well*;*
      *a second valve in fluid communication with the first pump, wherein, in response to actuating the second valve, the first pump causes the slurry to flow out of the tank, through the first pump and the second valve, and into the shaker;*
      *a third valve in fluid communication with the first pump, wherein, in response to actuating the third valve, the first pump causes the slurry to flow out of the tank, through the first pump and the third valve, and into a storage vessel;*
      *a fourth valve in fluid communication with the first pump, wherein, in response to actuating the fourth valve, the first pump causes the slurry to flow out of the tank, through the first pump and the fourth valve, and into the well; and*
      *a fifth valve in fluid communication with the first pump, wherein, in response to actuating the fifth valve, the first pump causes the slurry to flow out of the tank, through the first pump and the fifth valve, and into the particle size reducer.*

13. The system of claim [12] *10*, wherein the first sensor measures the property after the slurry flows through the second valve and before the slurry flows back into the tank.

14. The system of claim [12] *10*, further comprising a second pump in fluid communication with, and downstream from, the storage vessel, and wherein the second pump causes the slurry to flow out of the storage vessel.

20. A system for injecting a portion of a drilling fluid waste into a well, comprising:
   a shaker configured to separate solids from the drilling fluid waste to produce a filtered drilling fluid waste;
   a particle size reducer in fluid communication with the shaker and configured to reduce a cross-sectional dimension of at least a portion of the solids;
   a tank in fluid communication with the shaker and the particle size reducer, wherein the tank is configured to mix the filtered drilling fluid waste from the shaker with the solids from the particle size reducer to produce a slurry;
   a first pump in fluid communication with the tank and configured to cause the slurry to flow out of the tank, wherein the first pump also reduces the cross-sectional dimension of at least a portion of the solids in the slurry;

a first sensor configured to measure a property of the slurry;

a first valve in fluid communication with the tank and configured to be actuated to adjust the property in response to measuring the property; *and*

*a manifold of valves configured to be controlled to adjust a property of the slurry, the manifold comprising:* a second valve in fluid communication with the first pump, wherein, in response to actuating the second valve, the first pump causes the slurry to flow out of the tank, through the first pump and the second valve, and back into the tank;

a third valve in fluid communication with the first pump, wherein, in response to actuating the third valve, the first pump causes the slurry to flow out of the tank, through the first pump and the third valve, and into the shaker;

a fourth valve in fluid communication with the first pump, wherein, in response to actuating the fourth valve, the first pump causes the slurry to flow out of the tank, through the first pump and the fourth valve, and into a storage vessel;

a fifth valve in fluid communication with the first pump, wherein, in response to actuating the fifth valve, the first pump causes the slurry to flow out of the tank, through the first pump and the fifth valve, and into the well; and a sixth valve in fluid communication with the first pump, wherein, in response to actuating the sixth valve, the first pump causes the slurry to flow out of the tank, through the first pump and the sixth valve, and into the particle size reducer.

21. The method of claim 1, further comprising:
determining an injection rate to produce a predetermined surface pressure that does not propagate fractures in a subterranean formation through which the well extends; and controlling the injection pump to select the injection rate for pumping the slurry into the well.

*22. The method of claim 1, further comprising selecting a size of solids to be separated by the shaker based at least partially on a porosity of a subterranean formation through which the well extends, wherein reducing the cross-sectional dimension comprises filtering out solids larger than the size of solids using the shaker.*

*23. The method of claim 1, wherein, in response to actuating the first valve, the slurry flows out of the tank, through the first valve, and back into a bottom of the tank prior to being injected into the well.*

*24. The method of claim 1, wherein the manifold is configured to receive fluid from a single pump.*

\* \* \* \* \*